Patented May 4, 1948

2,440,688

UNITED STATES PATENT OFFICE 2,440,688

SEPARATION OF ANTHRACENE-CAKE CONSTITUENTS

Thomas Harold Insinger, Jr., Pittsburgh, Pa., assignor, by mesne assignments, to Koppers Company, Inc., a corporation of Delaware.

No Drawing. Application January 7, 1943, Serial No. 471,626

11 Claims. (Cl. 260—675)

The present invention relates to methods for obtaining highly purified anthracene from crude anthracene cake.

An object of the present invention is improvements in methods of employing the well-known reaction between anthracene and maleic anhydride, for separating refined anthracene from crude anthracene, whereby the usefulness of the employed maleic reagent is importantly improved.

A further object of the present invention is the provision of improvements whereby a solution of maleic acid, either in water or other solvent, can be directly employed for the recovery of refined anthracene from its crudes.

A further object of invention is improvement in methods for the thermal dissociation of the anthracene-maleic anhydride condensation product whereby improved recovery becomes possible of its maleic component for reuse for the stated purpose.

A further object of invention is to provide improvements that make feasible a recycling of maleic acid in a process for the recovery of refined anthracene from its crudes.

The invention has for further objects such other improvements and such other operative advantages or results as may be found to obtain in the processes or apparatus hereinafter described or claimed.

It is known to separate refined anthracene from its crudes by reacting the anthracene component with maleic anhydride to form a condensation product or addition compound, the said condensation product being thereafter separated from associated impurities and thermally dissociated to recover purified anthracene, preferably by methods disclosed in a copending application of Charles F. Winans Serial No. 395,694, filed May 28, 1941, now Patent 2,347,228, and wherein said separation is effected, for example, by alkaline extraction of said condensation product from impurities, followed by liberation of anthracene-maleic anhydride by acidulation of the said extract. The so-separated condensation product, in a further step, is thereafter dissociated by means including heat into its starting materials; that is, into pure anthracene and maleic anhydride, or into maleic acid in those instances where steam is employed as a carrier-vapor. Maleic acid must somehow be reconverted to maleic anhydride before it is again condensable with anthracene.

It is also known to convert maleic acid to the anhydride by means including heat and either with or without addition of chemical agents. Under the influence of heat, there is a definite tendency however for maleic acid to convert to fumaric acid in undesirable or uneconomical proportions, and fumaric acid is unemployable as such for formation of said condensation product of anthracene. Thus, the reemployment of a given quantity of maleic acid, or its anhydride, for separating anthracene from its crudes will soon exhaust it—a fact that, because of its cost, has heretofore made its use for the purpose economically questionable.

However, it has now been found that if, in the recovery of refined anthracene from its crudes, for example, the crude anthracene cake produced by distillation of coal tar, the maleic acid is dehydrated to maleic anhydride in situ while in contact with anthracene, the formation of said condensation product tends to go on while maleic anhydride is in a sort of nascent form, and that the tendency of maleic acid to convert into a fumaric acid is importantly reduced, and so much so, that the total loss occasioned is less than 2 per cent in a single cycle of a process for using this material in the formation of said condensation product from impure anthracene cake.

According to the present invention therefore anthracene, in crudes containing phenanthrene, carbazole, and the like, is treated for its conversion to the anthracene-maleic anhydride product while in direct contact with a source of maleic acid; that is, maleic acid is converted in situ in the mixture to its anhydride, which very probably in its nascent condition immediately combines with anthracene, and in this manner the maleic acid is so rapidly converted and removed from the reaction zone that any conversion to its isomer, fumaric acid, is relatively minor. By means of this improvement, yields of over 98 per cent of the anthracene-maleic anhydride condensation product can be easily produced in one step from a given quantity of maleic acid either as such or in aqueous or other solvent media. In the practice of the invention, the anthracene crude, while in solution in a solvent therefor, and preferably a stoichiometric quantity of maleic acid are heated in the presence of each other under conditions to effect the dehydration of the maleic acid to maleic anhydride which thereupon quickly dissolves in the solvent and combines with the also dissolved anthracene to form anthracene-maleic anhydride. For example, the anthracene cake is dissolved in such solvent medium therefor as xylene, decalin, cyclohexanone, ortho-dichlorobenzene, nitro benzene, phenylether, or in purified coke-oven solvent naphtha having a boiling range of about 160° C. to 180° C., and to which may be added if preferred, but not necessarily, certain proportions of a lower-boiling solvent such, for example, as benzene or toluene. To this solution is added an amount of maleic acid that is preferably stoichiometrically equivalent to the anthracene component of the dissolved cake and the mixture is boiled under reflux, the vapors being condensed in a refluxing device adapted to segregate water and any of the employed solvent medium simultaneously distilled therewith, the latter being continuously returned to the distillation equipment for reuse. The maleic acid can be introduced into the said solution of anthracene cake either as a solid, or it can be extracted from an aqueous solution thereof previously formed in the process system, as hereinafter set forth, by an appropriate solvent such as cyclohexanone which can then be employed as above stated for dissolving the anthracene cake, or such aqueous solution of maleic acid can be introduced into the reaction vessel containing the dissolved anthracene cake and the water-phase can then be removed by appropriate distillation and reflux before the actual conversion of the maleic acid into its anhydride, the temperature being increased as the removal of the water phase nears completion and the latter reaction begins to take place. Cyclohexanone is of advantage for the present purpose because it exhibits solvent properties for both maleic acid and its anhydride as well as also anthracene cake thus the condensation reaction can be carried out with all the reactants in single-phase solution. Xylene, toluene, benzene, and the like, are good solvents for maleic anhydride but have little solubility for maleic acid; thus, when they are employed as the solvent medium, the latter must be first converted by the said boiling step, to the therein soluble maleic anhydride which is then quickly dissolved and rapidly converts the dissolved anthracene into soluble anthracene-maleic anhydride.

Following the condensation reaction, the formed anthracene-maleic anhydride product is separated or removed from the solvent in which the impurities are dissolved; for example, by an appropriate solvent extraction and preferably by means of an aqueous solution of an alkali which forms a corresponding salt of the acid form of the anhydride complex. This extraction step is then followed by acidulation and liberation of the insoluble free acid; i. e., anthracene-maleic acid. However, if acidulation is carried out above about 80° C. there is directly liberated from the aqueous extract the water-insoluble anthracene-maleic anhydride itself. Thereafter, the said product is dissociated by heat for the recovery of refined anthracene. This dissociation is preferably carried out, in the presence of a sweep vapor, at less than atmospheric pressure and at high temperature; for example, vapors of the heated anhydride are passed in the presence of steam and at a pressure of about 30 millimeters mercury absolute through reactor apparatus maintained at about 400° C. The vapors effluent to the reactor are shock chilled and the liberated, refined anthracene is separated from the associated aqueous solution of maleic acid by filtration, or the like. This aqueous solution of maleic acid is then available for its recycling directly to the reaction vessel for recovery of further quantities of anthracene from crudes thereof, as hereinabove described, or its maleic acid content can be extracted from said aqueous solution by means of an appropriate solvent such as cyclohexanone and this solvent solution itself can be of the extracted maleic acid employed in the reaction vessel. The solvent employed for dissolution of the crude anthracene and for carrying out the described reaction can be of relatively narrow boiling range or of wide boiling range, the latter type of solvent being preferable in those instances where an aqueous solution of maleic acid is introduced directly into the reaction vessel. The process may be practiced stepwise or continuously with recycling of recovered maleic acid in the described process steps.

The following specific examples are illustrative of the results obtainable by operation of the present novel process. Unless otherwise noted all quantities are in parts by weight.

*Example 1*

4013 parts anthracene cake containing 42.4% of anthracene, the other constituents being predominantly phenanthrene and carbazole, were dissolved in 8000 parts of refined coke-oven solvent naphtha (boiling range 160° C.–180° C.) and 2900 parts benzene, to which was added 1137 parts maleic acid in aqueous solution, 930 parts thereof being recycled from a previous operation of the present improved process for refining anthracene. This admixture was heated, with condensation of vapors, by means automatically providing separation of condensed water and continuous selective return of the condensed solvent vapors to the reaction vessel. Subsequent to the removal of the aqueous phase, the amount of benzene returned to the reaction vessel was diminished with diminishing removal of water. At the end of the reaction period, which is indicated by absence of both water and benzene in the condensate, the residue in the reaction vessel was cooled to about 100° C. and then successively treated by heating first with a 3 per cent, and thereafter with a ½ per cent solution of sodium hydroxide, accompanied by continuous return of all condensed vapors, the said 3 per cent solution being obtained from a subsequent process step. The anthracene-maleic anhydride product was thereby substantially completely extracted from solvent as sodium anthracene-maleate. The solvent portion, after separation from said aqueous extract, was distilled and the distillate recycled to the initial step. The residuum can be successfully treated for the separation of carbazole and phenanthrene. The hot aqueous extract was then acidified between about 80° C. and 100° C., with vigorous stirring, by means of sulphuric acid to neutralize excess alkali and liberate free anthracene-maleic anhydride. The latter said product, under about 27 millimeters mercury absolute pressure, was then melted and vaporized with and in the presence of superheated steam at about 230° C. to 260° C., and a mixture of the vapors and steam was then flowed through a heated zone maintained at about 400° C., the contact time being about 0.3 second, and the products of the dissociation reaction were shock chilled immediately on leaving said heated zone. Upon filtration of the chilled dissociation products, the filtrate containing the recovered maleic acid, was recycled to the initial process step, whereas the filter cake was extracted for removal of undissociated anthracene-maleic anhydride product with 10 per cent sodium hydroxide solution. Filtrate and subsequent wash water from separated filter cake were combined and employed for extraction of anthracene-maleic anhydride from its aforementioned solvent solution. The 1598 parts of filtered, washed and dried cake, were anthracene having a greater than 98 per cent purity and represented a yield of 93.8 per cent of the original anthracene present in the initial crude.

In the following examples the efficiency provided by the process steps are individually examined.

Example 2

The efficiency of formation of anthracene-maleic anhydride according to the present invention is shown by the following data. 100 parts of an aqueous solution containing about 11.8 parts maleic acid were admixed with 30 parts benzene, 100 parts decalin and 25 parts anthracene (97.2 per cent pure). The said admixture was heated, with condensation of vapors, by means automatically providing separation of condensed water and selective return of the condensed solvent vapors to the reaction vessel. Subsequent to the removal of the aqueous phase, the amount of benzene return to the reaction vessel was diminished with diminishing removal of water. At the end of the reaction period, which is indicated by absence of both water and benzene in the condensate, the residue in the reaction vessel was cooled to about 100° C. and 8.4 parts sodium hydroxide in 300 parts water were added. The new mixture was refluxed for two hours, then cooled to 100° C. and the aqueous layer drawn off, after which 5 parts 35 per cent sodium hydroxide solution in 200 parts water were added to the decalin layer and the mixture refluxed for an hour, followed by separation of the two layers. The two aqueous extracts were combined, diluted with water and heated to 85° C. before addition of concentrated sulphuric acid to precipitate condensation product, the latter being thereupon filtered, washed, and dried. The 27.7 parts of recovered, dried anthracene-maleic anhydride, formed by this novel procedure, had a melting range of 259.0° C.-260.5° C. and represented an overall yield of 98.6 per cent from the quantity of maleic acid employed.

Example 3

The efficiency of dissociation of the product prepared in Example 2, carried out according to the present improvement, is shown by the following results. 500 parts anthracene-maleic anhydride were melted and vaporized with and in the presence of superheated steam at about 300° C., and the resulting vapors were thereafter flowed through a zone maintained at about 400° C., the contact time being about 0.4 seconds and the absolute pressure about 29.5 millimeters of mercury. The products of dissociation were condensed, the maleic acid solution filtered off, the resulting filter cake was boiled with 10 per cent sodium hydroxide solution to remove undissociated condensation product therefrom and the then remaining filter cake washed and dried. Analysis of the separated products showed a recovery of: 309 parts anthracene having a purity of 99.4 per cent; 185 parts maleic acid in water solution; 6 parts anthracene-maleic anhydride product; and 29 parts carbonaceous residue and unaccounted-for losses. This represents a dissociation efficiency of 95.8 per cent in a single cycle of operation, and a maleic acid recovery of 91.8 per cent.

Example 4

The efficiency of formation of anthracene-maleic anhydride by employment of a single solvent for the anthracene is shown by the following results. 236 parts of an aqueous solution containing about 42.7 parts maleic acid were admixed with 1300 parts xylene (boiling range 135° C.-140° C.) and 80 parts refined anthracene cake containing 90.3 per cent of anthracene. The said admixture was boiled, the vapors therefrom being condensed and the resultant condensate, comprising water and xylene, were separated, with return of the xylene as reflux to the reaction vessel. At the end of the reaction period, which is indicated by absence of water in the condensate, the residue in the reaction vessel was cooled to about 95° C. and 1040 parts of 4 per cent sodium hydroxide solution were added. The new mixture was refluxed for about 3 hours, then cooled to 95° C. and the aqueous layer drawn off, after which, 1010 parts of one per cent sodium hydroxide solution were added to the xylene layer and this mixture refluxed for 3 hours, followed by separation of the two layers. The two aqueous extracts were combined, diluted with water and heated to 85° C. before addition of concentrated sulphuric acid to precipitate anthracene-maleic condensation product extracted by the alkali from the solvent. After acidification, the precipitated anthracene-maleic anhydride was filtered, washed and dried. The dried anthracene-maleic anhydride represented 97.7 parts, an overall yield of 96.2 per cent from the quantity of maleic acid employed.

The process of invention is obviously of utility for synthesizing anthracene-maleic acid, or its anhydride, or any preferred salts thereof from starting materials that are substantially pure. Separation of so-formed anthracene-maleic anhydride from the employed solvent medium can be also effected, for example, by crystallization or distillation, as well as by liquid extraction.

The invention can be practiced by employing for the crude anthracene a solvent having a narrow or a relatively wide-boiling range; for example, xylene, or refined heavy solvent naphtha, or in fact any solvent material that boils within a temperature range of about 80° C. and the melting point of an anthracene-maleic anhydride product. Of utility also is a solvent agent that is a mixture of a low-boiling and a high-boiling material; for example, a mixture of benzene and decalin. Extraction of the anthracene-maleic anhydride from associated impurities, present in solution in the chosen solvent, can be effected with such alkaline-reacting aqueous solutions, as those of the hydroxides and carbonates of the alkali metals and alkaline earth metals.

As described in the specific examples, the invention provides that the anthracene-maleic anhydride is dissociated at reduced pressures and in the presence of steam at about 400° C. using contact times of 0.3 and 0.4 seconds. The process also gives high, recoverable yields of anthracene and maleic acid at contact times of from 0.01 second to 5 seconds. Dissociation of anthracene-maleic anhydride can be effected with steam and at less than atmospheric pressures within a temperature range defined by the melting point of anthracene-maleic anhydride and below about 500° C., at which temperature loss of the maleic component begins to occur by pyrolysis.

The invention as hereinabove set forth is embodied in particular form and manner but may be variously embodied within the scope of the claims hereinafter made.

I claim:

1. In a process for separating refined anthracene from crude anthracene containing phenanthrene, carbazole, or the like, by means of its linkage with the maleic radical, the improvement comprising the steps of: heating said crude anthracene while in solution in inert solvent means therefor in the presence of maleic acid to a temperature that is sufficient simultaneously to vaporize both water and solvent means from the resultant mixture and also to effect concurrently a linkage between anthracene of its said crude and maleic anhydride that is formed in situ in said mixture by the aforesaid vaporization of said water therefrom, and thereby concurrently dehydrating the maleic acid and forming anthracene-maleic anhydride therewith in the solution; separating from the resultant mixture a compound containing the anthracene-maleic linkage formed during the aforesaid heating; flowing the aforesaid compound containing the so-formed anthracene-maleic linkage, in the presence of steam and at a subatmospheric pressure, through reactor means at sufficiently elevated temperature to effect scission of said anthracene-maleic linkage; condensing vapors effluent to said reactor means; and separating from said condensed effluent both refined anthracene and aqueous solution of maleic acid produced by the aforesaid scission of said anthracene-maleic linkage.

2. In a process as claimed in claim 1, the step of re-employing in the first said step maleic acid that is recovered in the last said step as such for the separation of refined anthracene from a further quantity of its crude.

3. In a process as claimed in claim 1, the steps of employing, in the first described step of said method, aqueous maleic-acid solution that has been previously separated according to the described last step thereof by a prior practice of the process, and also vaporizing the aqueous phase of said maleic-acid solution in situ in the first step by heating and vaporizing of the inert solvent means containing the crude anthracene in solution in the first step.

4. A process as claimed in claim 1, and which includes the steps of extracting the maleic acid content from the aqueous solution of the last step of said claimed process with cyclohexanone and introducing the same to the first step of said process.

5. In a process for separating refined anthracene from crude anthracene containing phenanthrene, carbazole, or the like, by means of its linkage with the maleic radical, the improvement comprising the steps of: heating said crude anthracene while in solution in inert solvent means therefor in the presence of maleic acid to a temperature that is sufficient simultaneously to vaporize both water and solvent means from the resultant mixture and also to effect concurrently a linkage between anthracene of its said crude and maleic anhydride that is formed in situ in said mixture by the aforesaid vaporization of said water therefrom, and thereby concurrently dehydrating maleic acid and forming anthracene-maleic anhydride therewith in the solution; separating from the resultant mixture a compound containing the anthracene-maleic linkage formed during the aforesaid heating; flowing the aforesaid compound containing the so-formed anthracene-maleic linkage, in the presence of steam and at an absolute pressure of about 30 mm., through reactor means maintained between about 400°–500° C.; maintaining said mixture of steam and said compound at between about 0.01 to 5 seconds in contact with said heated reactor means, to effect scission of said anthracene-maleic linkage; condensing vapors effluent to said reactor means; and separating from said condensed effluent both refined anthracene and aqueous solution of maleic acid produced by the aforesaid scission of said anthracene-maleic linkage.

6. In a process for separating refined anthracene from crude anthracene containing phenanthrene, carbazole, or the like, by means of its linkage with the maleic radical, the improvement comprising the steps of: heating said crude anthracene while in solution in inert solvent means therefor in the presence of maleic acid to a temperature that is sufficient simultaneously to vaporize both water and solvent means from the resultant mixture and also to effect concurrently a linkage between anthracene of its said crude and maleic anhydride that is formed in situ in said mixture by the aforesaid vaporization of said water therefrom, and thereby concurrently dehydrating maleic acid and forming anthracene-maleic anhydride therewith in the solution; separating from the resultant mixture a compound containing the anthracene-maleic linkage formed during the aforesaid heating; flowing the aforesaid compound containing the so-formed anthracene maleic-linkage through reactor means at temperature sufficiently high to effect scission of said anthracene-maleic linkage, and at a contact time of between about 0.01 and 5 seconds; condensing vapors effluent to said reactor means; and separating from said condensed effluent both refined anthracene and a compound of said scission containing uncombined maleic radical.

7. In a process for separating refined anthracene from crude anthracene containing phenanthrene, carbazole, or the like by means of its linkage with the maleic radical comprising: dissolving crude anthracene in a solvent; adding aqueous maleic acid thereto; distilling the solution to drive off free water; raising the distillation temperature after the water is removed, to dehydrate the maleic acid, to distill off water separated from the maleic acid along with solvent, and to link maleic anhydride formed with anthracene to form a maleic anhydride-anthracene compound; condensing and separating the water and solvent removed by distillation; and returning solvent to the distillation zone.

8. The process defined in claim 7, and in which the anthracene and maleic acid are added in stoichiometric proportions to form the anthracene-maleic anhydride compound, and in which maleic acid is gradually dehydrated to supply maleic anhydride to form said compound, and in which benzene is employed as the solvent and is continuously returned to the distillation zone from the separation step until the maleic acid is dehydrated to form maleic anhydride to unite with all of the anthracene.

9. The process defined in claim 7, and in which the anthracene and maleic acid are added in stoichiometric proportions to form the anthracene-maleic anhydride compound, and in which the maleic acid is gradually dehydrated to supply maleic anhydride to form said compound, and in which benzene is employed as the solvent and is continuously returned to the distillation zone from the separating step until the maleic acid is dehydrated for forming said compound, and which includes the step of thereafter distilling off any remaining water and benzene solvent from the distilling zone to separate them from the anthracene-maleic anhydride compound.

10. The process defined in claim 7, and in which the solvent is made up of two components, one of which boils above the boiling temperature of water and the other of which is lower boiling and forms an azeotrope with water to assist in removing the water from the distillation zone.

11. The process defined in claim 7, and in which the solvent is made up of two components, one of which boils above the boiling temperature of water and is added in sufficient quantity to dissolve the crude anthracene, and the other of which is lower boiling and is added in sufficient quantity to effect separation of the water from the distillation zone.

THOMAS HAROLD INSINGER, Jr.

REFERENCES CITED

The following references are of record in the file of this patent:

UNITED STATES PATENTS

| Number | Name | Date |
| --- | --- | --- |
| 1,966,853 | Dvornikoff | July 17, 1934 |
| 2,340,490 | Porter | Feb. 1, 1944 |

OTHER REFERENCES

Paliakova, Organic Chem. Ind. (U. S. S. R.) 7, 305-8 (1940). (Copy in 260-675).